United States Patent
Chowaniec

[11] Patent Number: 5,203,894
[45] Date of Patent: Apr. 20, 1993

[54] MIST ELIMINATOR BLADE SPACER

[75] Inventor: James M. Chowaniec, Cape Coral, Fla.

[73] Assignee: Munters Corporation, Fort Myers, Fla.

[21] Appl. No.: 863,245

[22] Filed: Apr. 3, 1992

[51] Int. Cl.⁵ .............................................. B01D 45/08
[52] U.S. Cl. ..................................... 55/440; 55/257.2
[58] Field of Search .................. 55/257.2, 257.3, 278, 55/440–445

[56] References Cited

U.S. PATENT DOCUMENTS

| | | | |
|---|---|---|---|
| 808,897 | 1/1906 | Carrier | 55/257.3 |
| 910,045 | 1/1909 | Donaldson | 55/257.2 |
| 1,745,908 | 2/1930 | Paasche | 55/440 |
| 1,761,177 | 6/1930 | Bradshaw et al. | 55/444 |
| 1,833,674 | 11/1931 | Fedeler | 55/440 X |
| 1,834,534 | 12/1931 | Richards et al. | 55/440 |
| 2,793,017 | 5/1957 | Lake | 55/440 X |
| 3,132,190 | 5/1964 | Engalitcheff, Jr. | 55/257.2 X |
| 3,338,035 | 8/1967 | Dinkelacker | 55/440 |
| 3,520,116 | 7/1970 | Good | 55/440 |
| 4,361,426 | 11/1982 | Carter et al. | 55/257.2 |
| 4,500,330 | 2/1985 | Bradley, Jr. et al. | 55/440 X |
| 4,553,993 | 11/1985 | Wigley | 55/440 |
| 4,601,731 | 7/1986 | Michelson | 55/257.2 X |
| 4,784,674 | 11/1988 | Samiento et al. | 55/257.2 X |
| 4,897,206 | 1/1990 | Castelli | 55/257.2 X |
| 4,968,328 | 11/1990 | Duke | 55/440 X |

FOREIGN PATENT DOCUMENTS

| | | | |
|---|---|---|---|
| 480617 | 1/1975 | Australia | 55/440 |
| 1301349 | 8/1969 | Fed. Rep. of Germany | 55/257.2 |
| 55-073493 | 6/1980 | Japan | 55/440 |
| 520847 | 5/1940 | United Kingdom | 55/440 |
| 936529 | 9/1963 | United Kingdom | 55/440 |

*Primary Examiner*—Robert Spitzer
*Attorney, Agent, or Firm*—Fitzpatrick, Cella, Harper & Scinto

[57] ABSTRACT

A mist eliminator pack is disclosed which is formed of a plurality of non-planar mist eliminator sheets having first and second opposed and generally parallel edges with integrally formed offset tabs in at least the first edge of the sheets. The pads are dimensioned and positioned to engage an adjacent sheet on one side of their associated sheets, with the tabs being secured to the adjacent sheets by an adhesive, or the like, thereby to define an integral pack of evenly spaced sheets having uniform flow paths between the sheets.

13 Claims, 2 Drawing Sheets

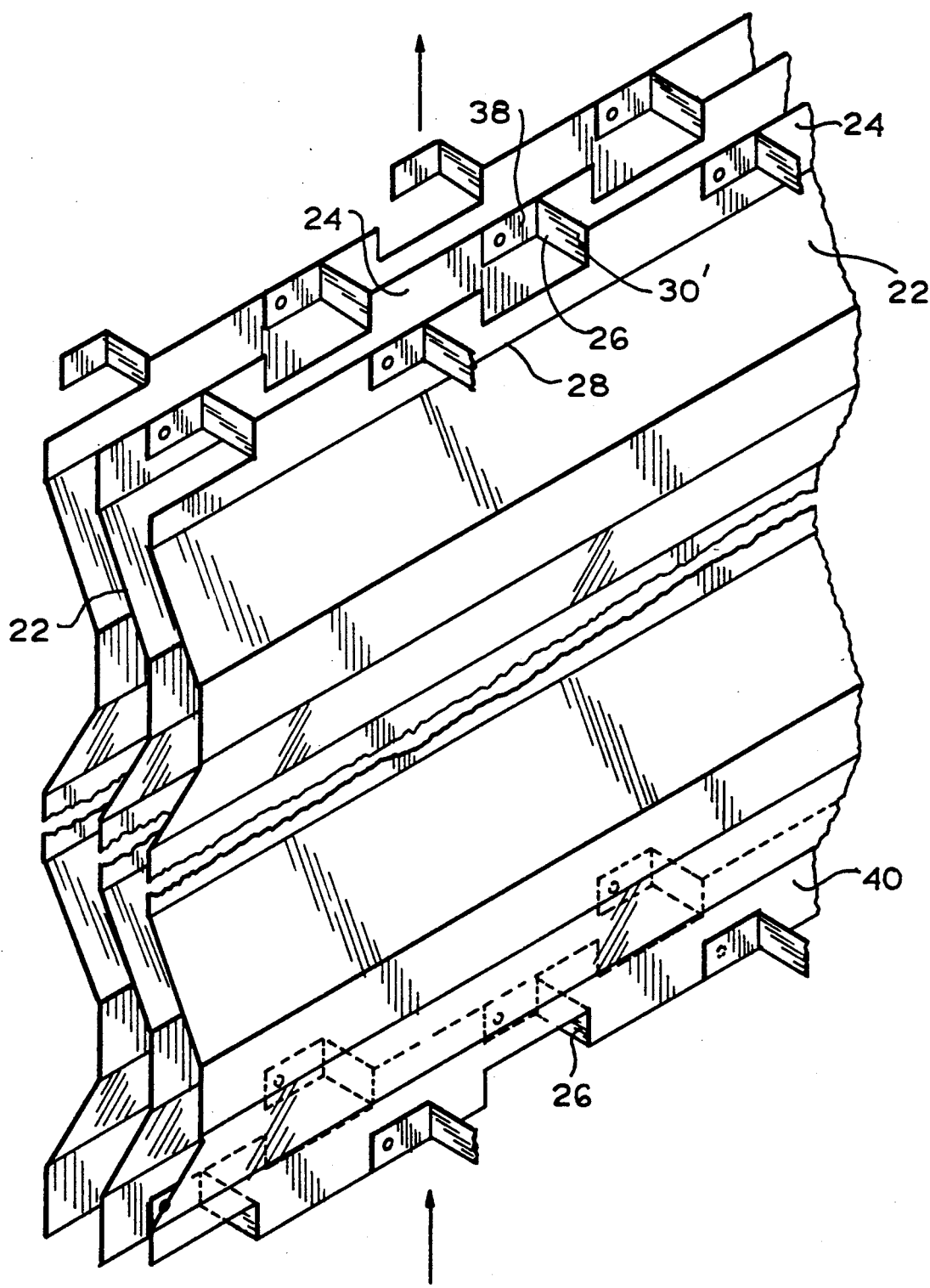
F I G. 2

MIST ELIMINATOR BLADE SPACER

The present invention relates to mist eliminator packs, and more in particular to a mist eliminator pack having integrally formed spacers.

Mist eliminator packs are generally formed of a series of sheets of corrugated or other non-planar material arranged to remove suspended liquids or droplets from a gas stream. The removal occurs as a result of interception of the particles by the surfaces of the sheets forming the mist eliminator through inertia forces.

Typically, one or more packs or modules, formed of mist eliminator sheets, are located in a scrubbing tower or a horizontal scrubbing casing. The packs are formed with a plurality of spaced plates, corrugated or in some other shape, to provide a plurality of non-straight or diverted flow paths for the gas stream. In the vertical scrubbing tower, gas flows vertically from the bottom towards the top of the pack. In a horizontal scrubber, the gas flows horizontally through the pack. The liquid impinging upon, or forming on the surfaces of the sheets, flows downwardly to a collection basin at the bottom of the tower and is thereby separated from the gases.

Mist eliminator packs of this generally above-described type are shown, for example, in U.S. Pat. Nos. 4,601,731 and 3,338,035.

In prior mist eliminator devices, the sheets forming the mist eliminator pack are mounted and held in place in the tower by relatively complicated mounting arrangements. Typically, these sheets are assembled with spacers between them and they are held in position with long bolts inserted through the sheets and the spacers. Such an arrangement is shown generally, for example, in U.S. Pat. No. 4,784,674. Another arrangement, shown in U.S. Pat. No. 4,322,234, requires the use of additional spacing plates and bars to hold the edges of the mist eliminator sheet material in relatively fixed uniformly spaced relationship to each other. Both of these devices require the manufacture of additional components which results in an increased expense. In addition, the structures are relatively complicated to assemble, requiring substantial manual labor.

Accordingly, it is an object of the present invention to provide an improved mist eliminator pack which does not require external components to hold the pack assembled in an integral body with uniform spacing between the sheets.

Another object of the present invention is to provide a mist eliminator construction which is easily assembled into an integral pack.

Yet another object of the present invention is to provide a self-supporting mist eliminator pack which is relatively rigid and maintains uniform spacing between the sheets defining the pack.

A still further object of the present invention is to provide a mist eliminator pack which is relatively simple in construction and economical to manufacture.

In accordance with an aspect of the present invention, a mist eliminator pack adapted for use in removing liquid components from a gas stream is provided which is formed of a plurality of mist eliminator sheets having generally complementary non-planar configurations. Each sheet has first and second parallel spaced edge portions. The first edge portion of each sheet has a plurality of generally L-shaped spacing and reenforcing tabs formed therein, each including a first leg extending perpendicularly away from its associated edge and the second leg extending perpendicularly from the first leg and parallel to its associated edge. The second leg of the tabs contact and are secured to the first edge of an adjacent sheet by an adhesive or by welding. As a result, the sheets are held in uniform spaced relationship to each other and create an integral pack.

The tabs on each sheet are longitudinally offset along their respective edge portions with respect to the tabs of the adjacent sheets so that the tabs of one sheet contact the first edge portion of the adjacent sheet.

The above and other objects, features and advantages of this invention will be apparent to those skilled in the art from the following detailed description of an illustrative embodiment thereof, which is to be read in connection with the accompanying drawings, wherein:

FIG. 2 is an enlarged perspective view of the mist eliminator vanes constructed in accordance with the present invention arranged for use in a vertical scrubber, as seen in FIG. 1.

Figure 1:
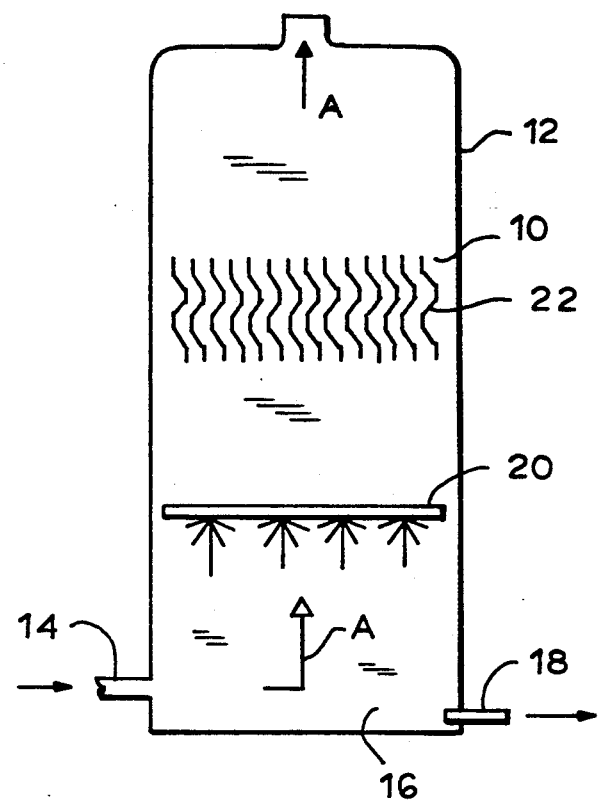
FIG. 1 is a schematic illustration of a scrubber column, showing in cross-section the positioning of the mist eliminator vanes of the present invention.

Referring now to the drawing in detail and initially to FIG. 1 thereof, a mist eliminator pack 10 constructed in accordance with the present invention is schematically illustrated within a housing or scrubber column 12 which has a gas inlet 14 through which a stream of gas to be cleaned or de-misted enters. The mist collected by the mist eliminators drip from the eliminator packs into the bottom 16 of the scrubber where they ar eliminated through an outlet 18. The column 12 may include conventional spray nozzles 20, or the like, if desired.

The mist eliminator pack 10 is formed from a plurality of sheets of non-planar material 22 in a known manner. These sheets may be formed of plastic materials, such as, for example, PVC or the like, or of sheet metal or the like, in a wide variety of configurations. In the illustrative embodiment the non-planar eliminator sheets 22 are formed in a so-called chevron shape when viewed from the edge. The shape is seen most clearly in FIG. 2.

In accordance with the present invention, the sheets 22 are arranged generally parallel to each other and in complementary positions with a uniform spacing therebetween. The spacing is such that preferably there are no straight line paths through the pack in the direction of gas flow, as indicated by the arrows "A." This spacing, as is known in the art, ensures that the gas passing the pack changes direction one or more times to cause the liquid droplets to impinge on the surface of the mist eliminator vanes or blades by inertia forces. Entrained liquid in the gas stream is thus caught on the blade surfaces and drained downwardly therefrom.

Although in the illustrative embodiment of the invention the vanes are shown as having relatively smooth surfaces, it will be understood by those skilled in the art that the surfaces may themselves have indentations or embossments formed thereon in order to aid in the collection of liquid.

In accordance with the present invention, the mist eliminator vanes 22 have upper or first edge portions 24 which are relatively flat and which are all parallel to each other. Each edge portion 24 has a plurality of L-shaped tabs 26 formed therein. These tabs are preferably cut directly from the material of which the edge 24 is formed and then bent into the L-shape illustrated in the drawing. This leaves a rectangular notch 28 formed in the edge portion 24 at each tab location. Each tab 26 has a first leg portion 30 which extends generally perpendicularly away from one side of the sheet edge 24 and a second leg 38 which extends perpendicularly to the leg 30. All of the tabs are uniformly dimensioned so that when the sheets are placed adjacent one another the legs 38 of tabs 26 contact the edge portion 24 of an adjacent sheet 22 on one side of their associated sheet. In addition, the sheets are positioned such that the tabs on one sheet are longitudinally offset from the tabs of the adjacent sheets so that the tab legs 38 will, in fact, contact a surface portion of the edge 24 rather than the notches 28 formed therein.

Preferably, legs 38 are secured to the edge portion 24 of adjacent sheets by means of an adhesive material of known composition. Alternatively, the legs can be secured to the edge portion 24 by welding, or the like.

The sheets 22 can be formed with the edge portion 24 and legs 26 formed along only one side thereof, if desired. This would leave the bottom edges of the sheets free and they could be mounted in a support frame having complementary notches formed therein. However, preferably, each of the sheets 22 includes a lower or second edge portion 40 which is relatively flat, as seen in FIG. 2, and which also has tabs 26 formed therein. As with the tabs formed in the edge 24, as described above, the lower tabs are generally L-shaped and include a leg portion which extends perpendicularly from its associated edge 40 and a second leg portion which is perpendicular to the first leg portion and which is adapted to be secured to the adjacent edge of an adjacent sheet. The tabs on the lower end of the pack are secured to adjacent sheets by an adhesive or by welding in the same manner as described above. This arrangement provides a relatively rigid pack construction which can simply be supported within the tower in any convenient manner, while maintaining uniform spacing between the sheets without any auxiliary mounting equipment such as had been required in the prior art.

The tabs 26 are integrally formed with the sheet material and are cut from the sheet using sharp-edged knives or dies. The tabs are carefully bent to provide sharp corners and sharp edges in the pack, particularly on the lower end thereof as seen in FIG. 2. These sharply defined points help to promote accumulation of the liquid flowing along the surfaces of the sheet and to rapidly drain the liquid from the sheets to prevent re-entrainment in the gas stream.

Figure 3:
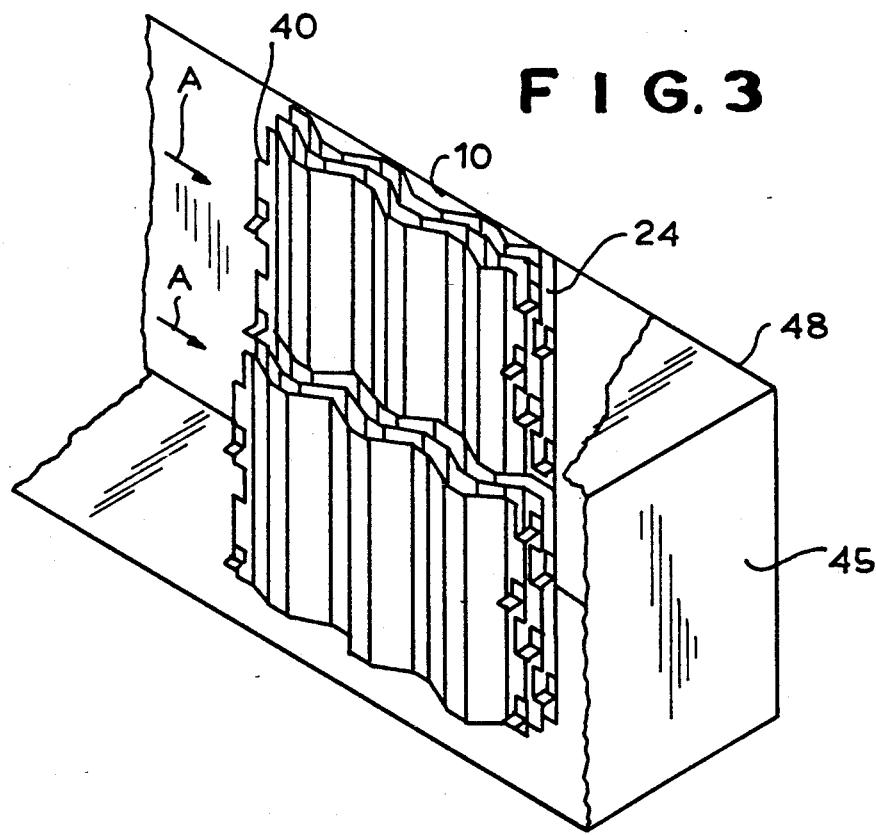
FIG. 3 is a perspective view of the mist eliminator vanes of the present invention arranged for use in a horizontal scrubber.

In the embodiment of the invention illustrated in FIG. 3, the mist eliminator pack 10 has simply been rotated 90° so that the edges 24, 40 thereof extend vertically. This arrangement is suitable for use in a horizontal scrubber wherein the air flows horizontally in the direction of the arrows "A" into the front edge of the pack, as seen in FIG. 3. The air can then flow directly out the end 45 of the housing 48 in the known manner, for example as described in U.S. Pat. No. 3,338,035.

The arrangement of the present invention provides a rigid pack construction and uniform spacing.

Although illustrative embodiments of the present invention have been described herein with reference to the accompanying drawings, it is to be understood that various changes an modifications may be effected therein by those skilled in the art without departing from the scope or spirit of this invention.

What is claimed is:

1. A mist eliminator pack for removing liquid components from a gas stream comprising:
   a plurality of mist eliminator sheets having first and second opposed and generally parallel edges and a non-planar configuration between said edges, said sheets being in substantially parallel alignment with each other;
   at least said first edge of each sheet having a plurality of offset tabs integrally formed therein positioned and dimensioned to engage an adjacent sheet on one side thereof; said tabs on each sheet being longitudinally offset from the tabs on sheets adjacent thereto, said offset tabs being generally L-shaped, each tab having a first leg extending generally perpendicularly to its associated edge and a second leg extending at right angles to the first leg and parallel to its associated sheet edge; and said second legs of said tabs being secured to the first edge of the adjacent sheet on said one side thereof thereby to define an integral pack of evenly spaced sheets to define uniform flow paths between the sheets.

2. A mist eliminator pack as defined in claim 1, including adhesive means for securing said second legs of the tabs to the adjacent edges of the sheets.

3. A mist eliminator pack as defined in claim 1, including offset tabs formed on said second edge of each of said sheets, said tabs on said second edges being dimensioned and positioned to engage the second edge of an adjacent sheet on one side thereof.

4. A mist eliminator pack as defined in claim 3, wherein said pack is positioned with said edges thereof positioned horizontally for vertical air flow between said sheets.

5. A mist eliminator pack as defined in claim 3, wherein said pack is positioned with said edges thereof positioned vertically for horizontal air flow between said sheets.

6. A mist eliminator pack for removing liquid components from a gas stream comprising a plurality of mist eliminator sheets having complementary non-planar configurations with each sheet having first and second parallel spaced edge portions; the first edge portion of each sheet having a plurality of generally L-shaped spacing and reenforcing tabs formed therein each including a first leg extending perpendicularly away from its associated edge and a second leg extending perpendicularly from the first leg and parallel to its associated edge, said second leg of said tabs contacting and being secured to the first edge of an adjacent sheet, and the tabs on each sheet being longitudinally offset along their respective sheets with respect to the tabs of adjacent sheets whereby said sheets form an integral pack of evenly spaced sheets to define uniform flow paths between the sheets.

7. A mist eliminator pack as defined in claim 6, wherein said offset tabs are integrally formed with their associated sheet.

8. A mist eliminator pack as defined in claim 7, including adhesive means for securing said second legs of the tabs to the adjacent edges of the sheets.

9. A mist eliminator pack as defined in claim 7, wherein said tabs are cut from the first edge and bent into said L-shape thereby defining slots in the first edge of the sheets whose length is equal to the length of the tab, said tabs in adjacent sheets being offset by at least the length of said slots.

10. A mist eliminator pack as defined in claim 9, including offset tabs formed on said second edge of each of said sheets, said tabs on said second edges being dimensioned and positioned to engage the second edge of an adjacent sheet on one side thereof.

11. A mist eliminator pack as defined in claim 10, wherein said pack is positioned with s id edges thereof positioned horizontally for vertical air flow between said sheets.

12. A mist eliminator pack as defined in claim 10, wherein said pack is positioned with said edges thereof positioned vertically for horizontal air flow between said sheets.

13. A mist eliminator pack as defined in claim 10, wherein said L-shaped tabs define sharp edges which promote drainage of water from the sheets.

* * * * *